United States Patent
Hamm

[11] Patent Number: 6,141,876
[45] Date of Patent: Nov. 7, 2000

[54] SOIL PIPE CUTTER

[75] Inventor: James E. Hamm, Grafton, Ohio

[73] Assignee: Emerson Electric Co., St. Louis, Mo.

[21] Appl. No.: 09/072,480

[22] Filed: May 4, 1998

[51] Int. Cl.[7] .......................... B23D 21/06; B26B 27/00
[52] U.S. Cl. ............................... 30/100; 30/101; 30/96; 30/92
[58] Field of Search ................ 30/101, 100, 92, 30/96; 225/97, 103; 81/177.2, 180.1, 177.8, 65.2

[56] References Cited

U.S. PATENT DOCUMENTS

| | | |
|---|---|---|
| 1,764,513 | 6/1930 | Kalfus . |
| 2,716,280 | 8/1955 | Ruhe .......................................... 30/101 |
| 2,825,969 | 5/1958 | Wheeler ................................... 81/65.2 |
| 2,835,969 | 5/1958 | Wheeler ................................... 81/65.2 |
| 2,949,669 | 8/1960 | Wheeler . |
| 2,950,035 | 8/1960 | Wheeler . |
| 3,027,638 | 4/1962 | Fightmaster .............................. 81/65.2 |
| 3,221,962 | 12/1965 | Small et al. . |
| 3,269,623 | 8/1966 | Janik . |
| 3,283,978 | 11/1966 | Coblitz . |
| 3,307,760 | 3/1967 | Small et al. . |
| 3,540,640 | 11/1970 | Coblitz . |
| 3,564,711 | 2/1971 | McFarland ............................... 30/100 |
| 3,763,559 | 10/1973 | Axbjer ..................................... 30/100 |
| 4,271,591 | 6/1981 | Aubriot . |
| 4,974,325 | 12/1990 | Härtlein . |

FOREIGN PATENT DOCUMENTS 229678   11/1943   Switzerland ............................. 30/100

*Primary Examiner*—M. Rachuba
*Assistant Examiner*—Sean Pryor
*Attorney, Agent, or Firm*—Vickers, Daniels & Young

[57] ABSTRACT

A soil pipe cutting device comprising a pair of pivotally interconnected arm members having jaw ends and actuator ends and a flexible, non-extendable cutter chain adjustably mounted between the jaw ends to circumscribe a pipe to be cut is provided with a screw-type actuating mechanism for displacing the jaw ends in the direction to tension the cutter chain to sever a pipe, and with a handle removably and adjustably mounted on the actuator end of one of the arms for transporting the cutter and for supporting and manipulating the cutter during a pipe cutting operation.

24 Claims, 4 Drawing Sheets

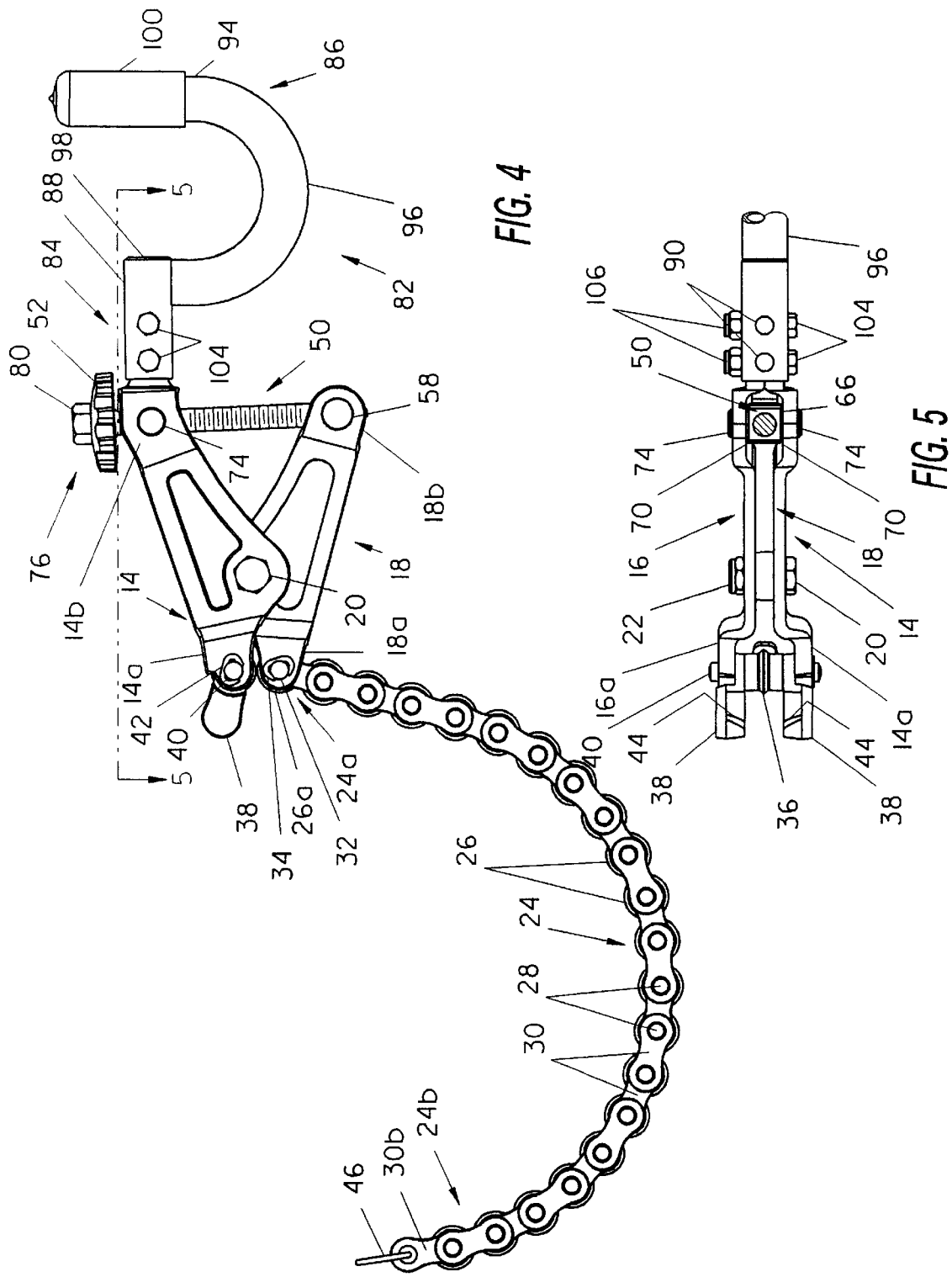

SOIL PIPE CUTTER

BACKGROUND OF THE INVENTION

This invention relates to pipe cutters and, more particularly, to improvements in cutters commonly known as soil pipe cutters.

As is well known, soil pipe cutters employ a chain carrying a plurality of cutting blades or wheels and which chain is wrapped around a pipe and tensioned for severing the pipe. Cutters of this type are particularly useful in cutting brittle pipes such as cast iron soil pipe and clay pipe. Generally, as shown for example in U.S. Pat. No. 2,949,669 to Wheeler and U.S. Pat. No. 3,221,962 to Small, et al., and U.S. Pat. No. 3,283,978 to Coblitz, one end of the chain is fixed to the jaw end of one of a pair of cutter arms which are pivotally interconnected intermediate the jaw ends and the opposite or actuator ends thereof. The chain is then wrapped around a pipe to be cut and the other end of the chain is attached to the jaw end of the other arm. Tension is then applied to the chain by an actuating mechanism operable to relatively displace the actuator ends of the arms in the direction to move the jaw ends toward one another. Any suitable mechanism can be used for the latter purpose and can, for example, include a manually rotatable screw arrangement as shown in the patents to Small, et al. and Coblitz, or a linearly displaceable rod or the like operated through a pressure actuator such as the hydraulic actuator shown in the patent to Wheeler.

Pipe cutters of the foregoing character heretofore available are difficult to carry and manipulate due, in part, to the size and weight thereof and, in some instances, the position of a handle provided for carrying the cutter. Further, the arms and actuating mechanisms in cutters such as those in the above patents are neither designed nor constructed as handles and, accordingly, manipulation of the cutter with respect to positioning the arms and chain relative to a pipe to be cut can be cumbersome as well as uncomfortable for the user. Even if the arm structure is extended beyond the actuator ends thereof to provide a handle, the position or direction of the handle relative to the remainder of the cutter renders carrying and manipulating of the cutter into a position of use both cumbersome and uncomfortable from the standpoint of stresses imposed on the user's wrist. Moreover, these problems can be more pronounced when the user is required to manipulate the cutter in a constricted working space such as a trench. Still further, the structural configuration of the arms and actuating mechanisms in cutters such as those in the above patents render the cutters awkward to carry to and from a site of use and this, together with the structural configurations of the component parts of the cutter can make such carrying uncomfortable for the user.

If one person is going to use a cutter of the foregoing character, the cutter must be held in one hand adjacent to the pipe and the other hand used to wrap the chain around the pipe and to connect the free end of the chain to the jaw end of the other arm of the cutter. The user must then continue to support the cutter with one hand as the actuating mechanism is operated to the extent necessary to secure the cutter in place about the pipe prior to further operating the actuating mechanism to achieve the cutting operation. Operating the actuating mechanism can be an additional problem to the foregoing problems regarding carrying and manipulation of the cutter into its use position relative to a pipe to be cut. In this respect, as will be appreciated for example from the patents to Small, et al., Wheeler and Coblitz mentioned above, the actuating mechanisms are structurally complex and protrude from the actuating ends of the cutter arms. This structure, in addition to adding to the difficulty of manipulating the cutter into position for and then mounting on a pipe to be cut can encumber operation of the actuating mechanism, especially if the cutter is being used in a confined environment. Moreover, operation of the actuating mechanisms in each of the foregoing patents is limited to the use of a single operating member, namely the levers in Small, et al. and Coblitz and the pump unit in Wheeler. Accordingly, it will be appreciated that use of soil pipe cutters heretofore available by one person is awkward and cumbersome as well as uncomfortable in that the cutters are not structured to accommodate the needs of users thereof.

SUMMARY OF THE INVENTION

In accordance with the present invention, a pipe cutter is provided by which the foregoing and other problems encountered in connection with such pipe cutters heretofore available are advantageously minimized or overcome. More particularly in this respect, a pipe cutter according to the present invention is provided with a handle which facilitates carrying the cutter and supporting and manipulating the cutter in connection with the mounting thereof on a pipe to be cut. Advantageously, the handle is removable whereby, if the space in which the cutter is to be used is confined, it can be comfortably carried to the site and, depending on the circumstances, mounted on the pipe to be cut either prior to or following removal of the handle. In either event, mounting is achieved with minimal inconvenience to the operator. In accordance with another aspect of the invention, the handle is selectively mountable on the cutter in any one of a plurality of different positions relative thereto, thus promoting convenience and comfort for the user in connection with both carrying the cutter and supporting and manipulating the cutter and supporting and manipulating the cutter in a particular situation of use.

In accordance with yet another aspect of the invention, the arms of the cutter are operated by a screw-type actuating mechanism associated with the actuating ends of the cutter arms in a manner which optimizes structural compactness of the actuating mechanism as well as the versatility with respect to operation thereof. In particular in this respect, the screw actuator is preferably provided with an operating knob for rotating the screw by hand and which advantageously promotes convenience with respect to initially tightening the chain into engagement with a pipe to be cut. Versatility is promoted by providing a sleeve on the operating knob having non-circular interior and exterior surfaces which advantageously enable rotation of the screw, selectively, through the use of a variety of different wrenches including ratchet operated wrenches. Moreover, the handle and actuating mechanism in combination provide for a cutter in accordance with the invention to be structurally simple, economical to manufacture and easy to transport and use.

It is accordingly an outstanding object of the present invention to provide an improved pipe cutter of the type including a chain carrying cutting wheels and which is wrapped around a pipe and tensioned to sever the pipe.

Another object is the provision of a cutter of the foregoing character which is more comfortable and less cumbersome to transport, install and operate in connection with cutting pipe.

A further object is the provision of a cutter of the foregoing character which is structurally compact and easily supported and manipulated by a user in connection with transporting the cutter and mounting the cutter on a pipe to be cut.

Still a another object is the provision of a cutter of the foregoing character having a manually operable actuating mechanism with improved versatility with respect to operation thereof.

Still a further object is the provision of a cutter of the foregoing character having a removable handle by which the cutter can be carried and manipulated in connection with mounting the cutter on a pipe to be cut.

A further object is the provision of a cutter of the foregoing character in which the handle is selectively mountable in a number of different positions relative thereto to optimize versatility with respect to an operator's carrying and manipulating the cutter with respect to the mounting thereof on and/or the cutting of a pipe.

Another object is the provision of a cutter of the foregoing character having a screw-type actuating mechanism which is structurally simple and compact, which includes an operating knob to facilitate initial mounting of the cutter on a pipe and which enables rotation of the screw, selectively, by a variety of different tools.

BRIEF DESCRIPTION OF THE DRAWINGS

The foregoing objects, and others, will in part obvious and in part pointed out more fully hereinafter in conjunction with the written description of a preferred embodiment of the invention illustrated in the accompanying drawings in which:

FIG. 4 is a side elevation view of the cutter; and, FIG. 5 is a plan view of the cutter.

DESCRIPTION OF THE PREFERRED EMBODIMENT

Figure 1:
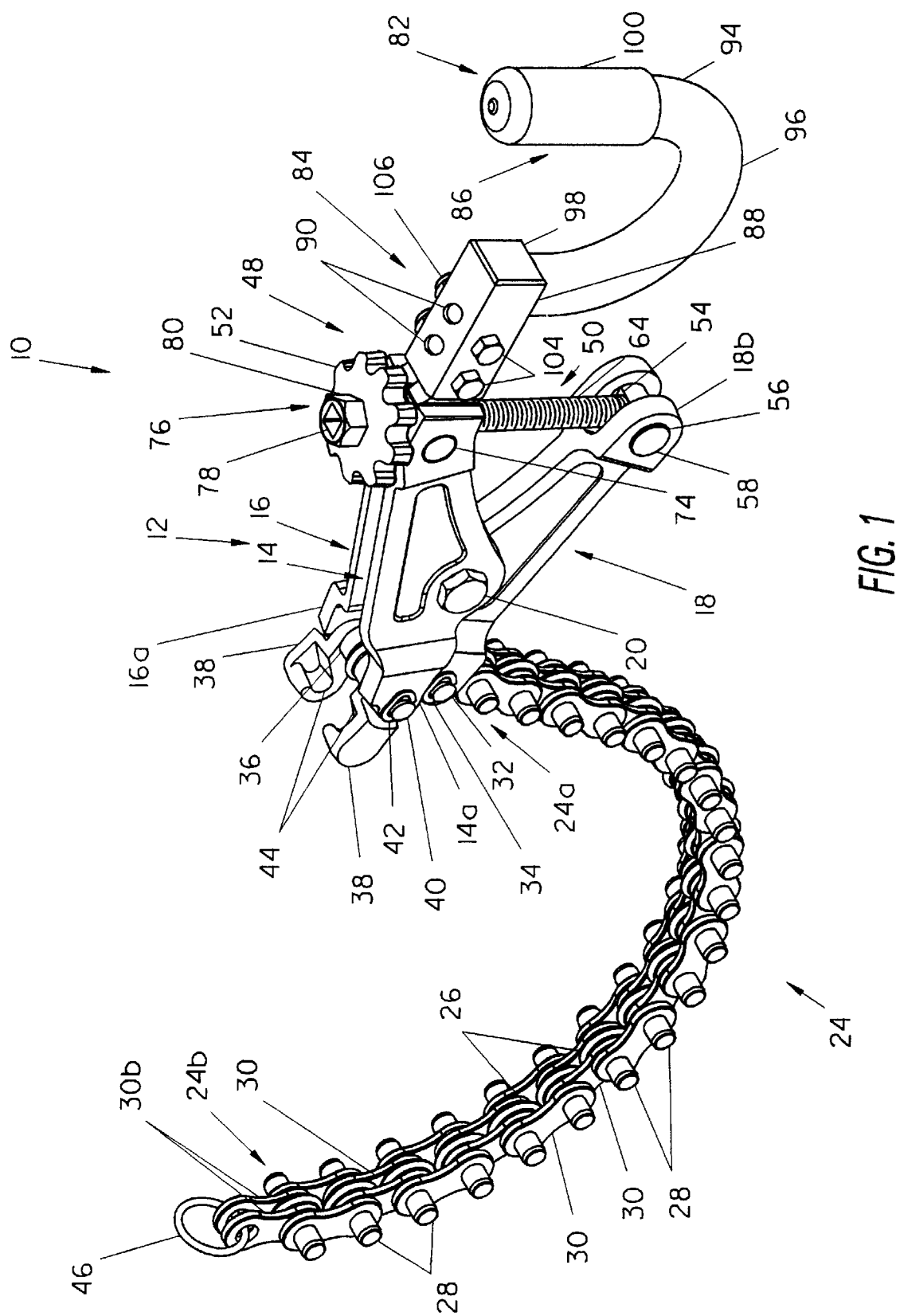
FIG. 1 is a perspective view of a pipe cutter according to the present invention.
Figure 2:
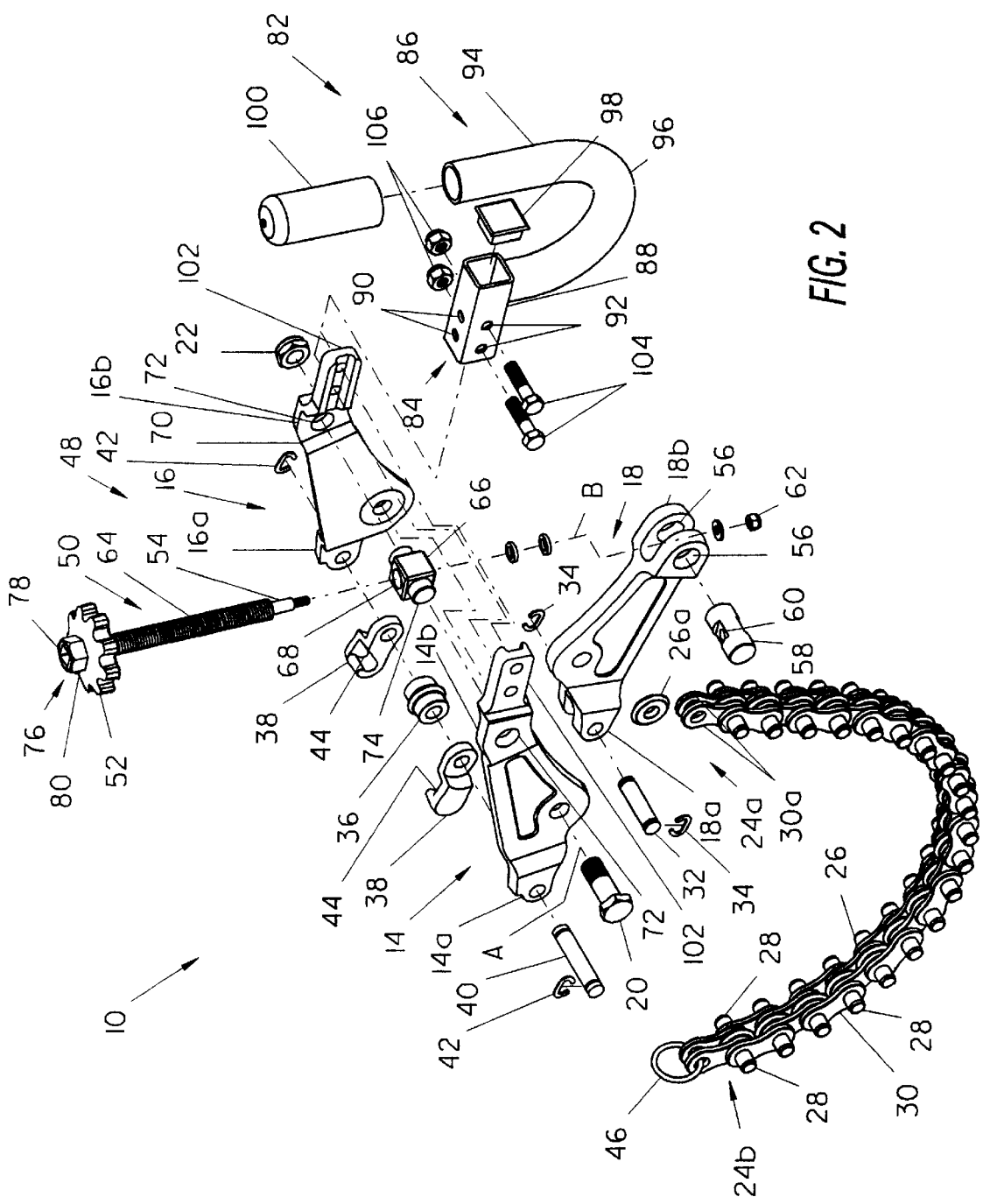
FIG. 2 is an exploded perspective view of the pipe cutter shown in FIG. 1.
Figure 3:
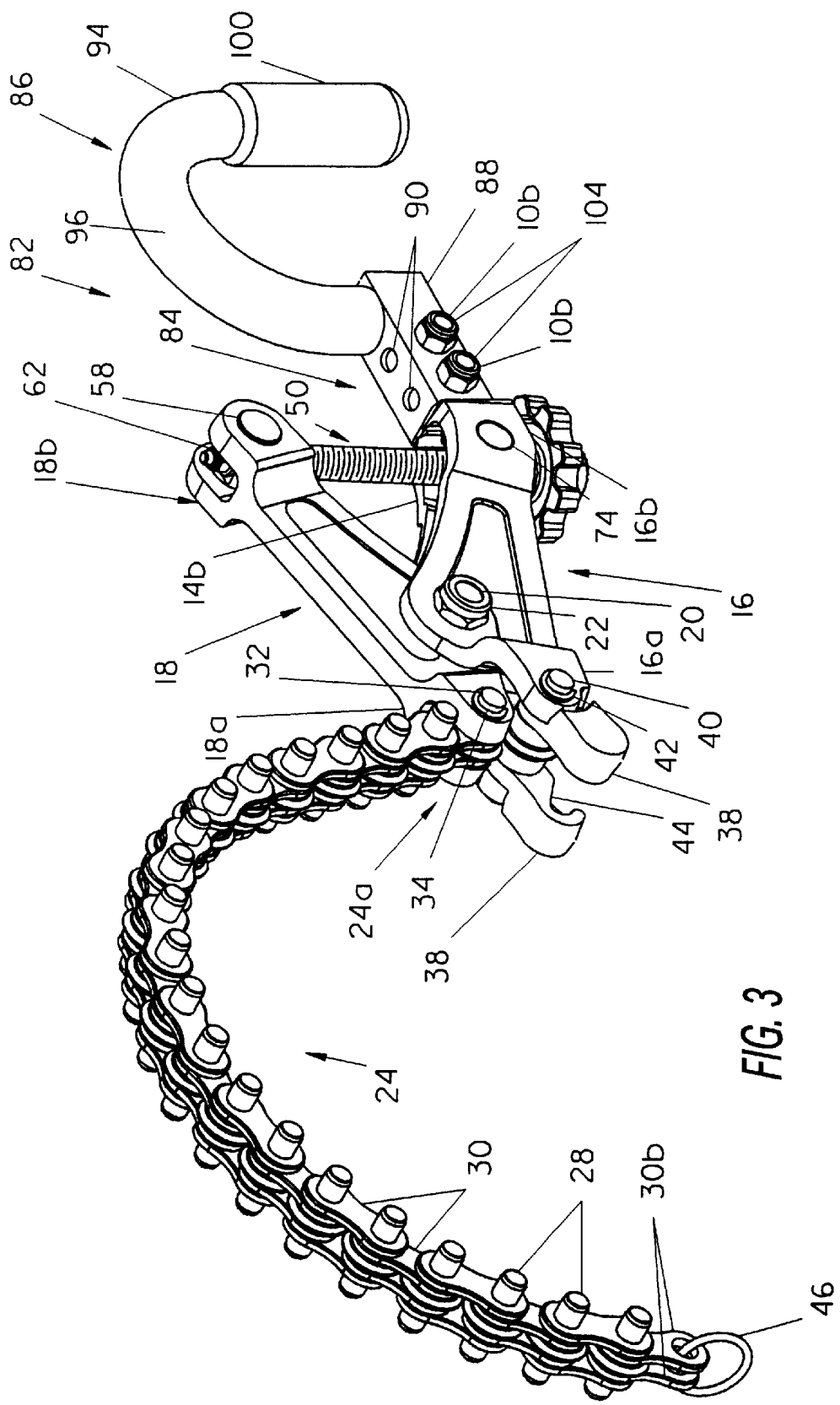
FIG. 3 is an inverted perspective view of the cutter shown in FIG. 1.

Referring now in greater detail to the drawings, wherein the showings are for the purpose of illustrating a preferred embodiment of the invention only and not for the purpose of limiting the same, a pipe cutter 10 in accordance with the invention and in the orientation shown in FIGS. 1, 2 and 4 of the drawing includes an upper arm 12 which, as best seen in FIG. 2, comprises a pair of mirror image arm members 14 and 16 having jaw ends 14a and 16a, respectively and actuator ends 14b and 16b, respectively. Cutter 10 further includes a lower arm 18 having a jaw end 18a and an actuator end 18b. Arm members 14 and 16 and arm 18 are assembled with arm 18 between members 14 and 16, and the arms are interconnected by a bolt 20 which extends through openings therefor in arm members 14 and 16 and arm 18, not designated numerically, and receives nut 22 on the free end thereof. Bolt 20 supports upper and lower arms 12 and 18 for pivotal displacement relative to one another about a jaw axis A which extends transverse to the direction between the jaw and actuator ends of the arms. Pipe cutter 10 further includes a cutter chain 24 comprising cutter wheels 26 at each of the link pins 28 connecting the chain links 30. End 24a of the cutter chain is fixed to jaw end 18a of arm 18 and, in this respect, jaw end 18a is bifurcated to receive end links 30a and end cutter wheel 26 which are held in place in end 18a by a chain mounting pin 32. Pin 32 extends through openings therefor in end 18a and in the links and cutter wheel and receives retaining rings 34 on the opposite ends thereof. End 24b of the cutter chain is adjustably interconnected with the jaw end of upper arm 12 as provided by ends 14a and 16a of arm members 14 and 16. More particularly in this respect, the latter ends of arm members 14 and 16 are spaced apart to receive a wheel spacer 36 and opposed chain hook members 38 therebetween, and the spacer and hooks are pivotally mounted at ends 14a and 16a by a pivot pin 40. Pin 40 extends through openings therefor in the ends of the arms, hooks and spacer and receives retaining rings 42 on the opposite ends thereof. As is well known, each of the hooks 38 includes an inwardly facing pocket 44 which receives the corresponding end of one of the link pins 28 to support the free end of the cutter chain when the latter extends around a pipe to be cut. In the embodiment illustrated, links 30b at free end 24b of the cutter chain are interconnected by a ring member 46 by which the free end can be easily manipulated relative to the jaw end of upper arm 12.

Actuator ends 14b and 16b of upper arm members 14 and 16 are interconnected with actuator end 18b of lower arm 18 by an actuating mechanism 48 which is operable as set forth hereinafter to displace the jaw ends of upper and lower arms 12 and 18 toward and away from one another about jaw axis A. In the preferred embodiment, actuating mechanism 48 includes an actuating rod or feed screw 50 having an upper or outer end 51 provided with an operating knob 52 mounted thereon such as by a press fit. Feed screw 50 has a lower end 54 rotatably interconnected with actuator end 18b of arm 18. More particularly in this respect, end 18b is bifurcated to receive lower end 54 of rod 50 and is provided with apertures 56 for receiving a pivot pin 58 having an opening 60 therethrough which rotatably receives lower end 54 of the rod. The latter end of the actuator rod extends downwardly beyond opening 60 and is threaded to receive a retaining nut 62 by which the lower end of the rod is engaged with pivot pin 58 against separation therefrom. Actuator rod 50 includes a threaded shank 64 between knob 52 and end 54 and shank 64 extends through a pivot nut 66 in threaded interengagement with a threaded bore 68 extending therethrough. Actuator ends 14b and 16b of upper arms 14 and 16 are provided with inwardly open recesses 70 which receive the opposite sides of nut 66, and recesses 70 include pin openings 72 which pivotally receive pins 74 extending outwardly from the opposite sides of nut 66. Accordingly, it will be appreciated that rotation of actuator rod 50 in opposite directions about its axis B which is spaced from and transverse to jaw axis A operates to displace nut 66 axially therealong in opposite directions, whereby the jaw ends of the arms move toward and away from one another. In accordance with one aspect of the invention, outer end 51 of actuator rod 50 is machined to provide a sleeve 76 coaxial with the feed screw. Sleeve 76 has non-circular inner and outer surfaces which, in the illustrated embodiment, provide a square opening 78 therein and a hexagonal outer surface 80. This advantageously enables the actuator rod to be rotated, selectively, by hand through knob 52, through the use of a ratchet received in opening 78, or by a box, ratchet socket or other wrench engaging about outer surface 80 of sleeve 76.

In accordance with another aspect of the invention, the actuating end of one of the upper and lower arms is provided with a handle by which the cutter can be transported and supported and manipulated in connection with the use thereof in cutting a pipe. In the embodiment disclosed, the handle is designated generally by the numeral 82 and includes a mounting end 84 by which the handle is removably mounted on upper arm 12, as set forth more fully hereinafter, and a U-shaped gripping end 86 by which the cutter can be transported and supported and manipulated during use of the cutter in cutting a pipe. In the preferred embodiment, mounting end 84 comprises a square steel tube 88 having openings 90 and 92 through different ones of the opposed walls thereof for the purpose set forth hereinafter, and gripping end 86 comprises a circular steel tube having a leg 94 spaced outwardly from tube 88 and an arcuate connecting portion 96 extending from leg 94 and secured to tube 88 such as by welding. Preferably, the outer end of tube 88 is closed by a plastic cap 98, and leg 94 receives a handle grip 100 of suitable rubber or plastic material.

Upper arm 12 of the cutter is provided with a projection extending rearwardly from the actuator end thereof and into mounting tube 88 of the handle and, in the embodiment illustrated, the projection is defined by projection components 102 extending outwardly from actuator ends 14b and 16b of upper arm members 14 and 16. The projection components are provided with aligned openings therethrough, not designated numerically, and when the projection is received in tube 88 bolts 104 are adapted to extend through openings 92 in tube 88 and the openings in projection components 102 and to receive nuts 106 so as to removably mount handle 82 on the cutter. In the orientation shown in FIGS. 1 and 2, gripping end 86 of the handle is in a plane transverse to jaw axis A, and leg 94 extends vertically and transverse to the direction between the jaw and actuator ends of arms 12 and 18. Openings 90 in tube 88 enable the handle to be removed and remounted on the projection for gripping end 86 to be in a plane parallel to jaw axis A, and for leg 94 to extend horizontally and transverse to the direction between the jaw and actuator ends of the arms. Advantageously in accordance with the preferred embodiment, the selective mounting of handle 82 enables gripping end 86 to extend in either direction horizontally and vertically relative to the actuator ends of the arms. Moreover, the arcuate contour of connecting portion 96 advantageously provides for the handle to be comfortably held in the connecting portion or by leg 94 in each of the selectable positions, thus optimizing the ease of use for the operator depending on the circumstances of use, including whether the user is right handed or left handed. As will be further appreciated, the handle can be completely removed where, for example, the space for using the cutter is so constricted as to make removal of the handle either necessary or desirable.

It is believed that the mounting or installation of the cutter about a pipe to be cut and operation of the cutter in severing a pipe will be readily apparent from the foregoing description. Briefly in this respect, the user holds cutter 10 in one hand by handle 82 and rotates the actuating mechanism through knob 52 with the other hand to the spread jaw ends of arms 12 and 18 to the extent desired. The jaw ends are then placed against a pipe to be cut, chain 24 is wrapped thereabout and free end 24b of the chain is attached to the jaw end of upper arm 12 by inserting link pins 28 in recesses 44 of chain hook members 38. The operator then rotates knob 52 and thus actuator rod 50 to tighten chain 24 about the pipe, and thereafter tensions chain 24 by rotation of actuator rod 50 through a suitable tool interengaged with opening 78 or outer surface 80 of sleeve 76 until the pipe is severed. During operation of the actuating mechanism, handle 82 advantageously provides a point at which the operator can steady himself and optimize the ability to apply leverage to the actuating mechanism for achieving the severing operation. Moreover, the operator can quickly remove and reorient the handle relative to the cutter to optimize the comfort and ease with which support and manipulation of the cutter and operation of the actuating mechanism is achieved. When the severing operation is completed, the handle facilitates supporting the cutter during separation and removal from the cut pipe and transporting of the cutter to the next point of use.

While considerable emphasis has been placed herein on the structures and structural interrelationships between the component parts of the preferred embodiment, it will be appreciated that other embodiments can be made and that many changes can be made in the preferred embodiment without departing from the principals of the present invention. In particular in this respect, it will be appreciated that other handle profiles and mounting arrangements can readily be devised, and that a removable and adjustable handle in accordance with the present invention can be used in conjunction with actuating mechanisms other than the screw type mechanism of the preferred embodiment. These and other modifications of the preferred embodiment as well as other embodiments of the invention will be suggested and obvious from the disclosure of the preferred embodiment herein, whereby it is to be distinctly understood that the foregoing descriptive matter is to be interpreted merely as illustrative of the present invention and not as a limitation.

Having thus described the invention, it is so claimed:

1. A pipe cutting device comprising, first and second arms each having a jaw end and an actuator end, means interconnecting said arms for pivotal displacement about a jaw axis extending in a given direction transverse to the longitudinal direction between the jaw and actuator ends thereof, displacement of the actuator ends in one of the directions away from one another displacing the jaw ends toward one another, a flexible, non-extendible cutter chain adjustably mounted between the jaw ends of said arms to circumscribe a pipe to be cut and having a plurality of cutting elements thereon, a threaded actuator rod, means interconnecting said rod with the actuator ends of said arms for rotation about a rod axis spaced from and transverse to said jaw axis and for rotation of said rod in opposite directions about said rod axis to displace said actuator ends toward and away from one another, means for rotating said rod in said opposite directions, and a handle mounted on the actuator end of only one of said arms, said handle including a first end attached to said actuator end of said one arm and a gripping end extending from said first end transverse to said given direction.

2. A device according to claim 1, wherein said first end of said handle and said actuator end of said one arm include telescopically interengaging elements, and fasteners for interlocking said elements.

3. A device according to claim 2, wherein said mounting means includes a projection on said actuator end of said one arm and a sleeve on said handle receiving said projection, said projection and said sleeve having a common axis and being adjustable about said axis relative to one another between a plurality of different positions, and said fasteners releasably interconnecting said projection and sleeve in each position of said plurality of positions.

4. A device according to claim 3, wherein said projection and said sleeve are of non-circular contour in cross section.

5. A device according to claim 4, wherein said contour is square.

6. A pipe cutting device comprising first and second arms each having a jaw end and an actuator end, each of said arms being pivotally mounted about a given axis transverse to the longitudinal direction between the jaw and actuator ends thereof, whereby displacement of the actuator ends away from each other displaces the jaw ends toward each other, a flexible, non-extendable cutter chain having a plurality of cutting elements thereon and adjustably mounted between said jaw ends of said arms to circumscribe a pipe to be cut as said chain is wrapped around said pipe and tightened by said jaw ends being displaced toward each other, an actuating means for displacing said actuator ends of said arms toward and away from one another with only one of said actuator ends having a structural extension and a manually manipulated handle separate from said actuating means and removably attached to said structural extension.

7. A device according to claim 6, wherein said handle is selectively mountable on said one arm in a plurality of different positions.

8. A device according to claim 6, wherein said handle includes a mounting end for attachment to said actuator end of said one arm and a gripping end extending from said mounting end transverse to the direction between the jaw and actuator ends of said one arm.

9. A device according to claim 8, wherein said handle is selectively mountable on said one arm so said gripping end is in one of a plurality of different positions transverse to said longitudinal direction.

10. A device according to claim 9, wherein said gripping end of said handle is U-shaped.

11. A device according to claim 8, wherein said handle is selectively mountable on said one arm in a plurality of different positions.

12. A device according to claim 11, wherein said handle is selectively mountable on said one arm so said gripping end is generally coplanar with or generally perpendicular to said jaw axis.

13. A device according to claim 12, wherein said gripping end of said handle is U-shaped.

14. A device according to claim 13, wherein said handle includes a non-circular tube and said actuator end of said one arm includes a non-circular extension whereby said tube and extension are telescopically interengageable.

15. A device according to claim 14, wherein said tube is integral with said handle and receives said extension, said extension and said tube have a common axis and are adjustable about said common axis relative to one another between a plurality of different rotated positions and means for releasably interconnecting said extension and tube in each position of said plurality of positions.

16. A device according to claim 15, wherein said actuating means comprises a threaded actuator rod, means interconnecting said rod with the actuator ends of said arms for rotation about a rod axis spaced from and transverse to said jaw axis and for rotation of said rod in opposite directions about said rod axis to displace said actuator ends toward and away from one another and means for rotating said rod in said opposite directions.

17. A device according to claim 16, wherein said actuator rod has an end outwardly adjacent said actuator end of said one arm and said means for rotating said rod includes a manually rotatable operating knob on said end of said rod for manually rotating said rod and a sleeve on said outer end of said rod having non-circular outer and inner surfaces coaxial with said rod axis for selective interengagement with tools for rotating said rod.

18. A device according to claim 6, wherein said actuating means comprises a threaded actuator rod, means interconnecting said rod with the actuator ends of said arms for rotation about a rod axis spaced from and transverse to said jaw axis and for rotation of said rod in opposite directions about said rod axis to displace said actuator ends toward and away from one another and means for rotating said rod in said opposite directions.

19. A device according to claim 18, wherein said actuator rod has an end outwardly adjacent the actuator end of one of said arms and said means for rotating said rod includes a manually rotatable operating knob on said end of said rod for manually rotating said rod and a sleeve member on said outer end of said rod having non-circular outer and inner surfaces coaxial with said rod axis for selective interengagement with tools for rotating said rod.

20. A device according to claim 6, wherein said handle and said extension of said one arm include telescopically interengaging non-circular mounting elements therebetween.

21. A device according to claim 20, wherein said mounting elements include an extension on said actuator end of only said one arm and a tube on said handle receiving said extension.

22. A device according to claim 21, wherein said extension and said tube have a common axis and are adjustable about said common axis relative to one another between a plurality of different positions, and a fastener releasably interconnecting said extension and tube in each position of said plurality of positions.

23. A device according to claim 22, wherein said actuating means comprises a threaded actuator rod, means interconnecting said rod with the actuator ends of said arms for rotation about a rod axis spaced from and transverse to said jaw axis and for rotation of said rod in opposition directions about said rod axis to displace said actuator ends toward and away from one another, and means for rotating said rod in said opposite directions.

24. A device according to claim 23, wherein said actuator rod has an end outwardly adjacent the actuator end of one of said arms and said means for rotating said rod includes a manually rotatable operating knob on said end of said rod for manually rotating said rod, and a sleeve member on said outer end of said rod having non-circular outer and inner surfaces coaxial with said rod axis for selective interengagement with tools for rotating said rod.

* * * * *